C. F. MEGOW.
TWO-SPEED WHEEL.
APPLICATION FILED AUG. 30, 1915.
1,169,852.
Patented Feb. 1, 1916.
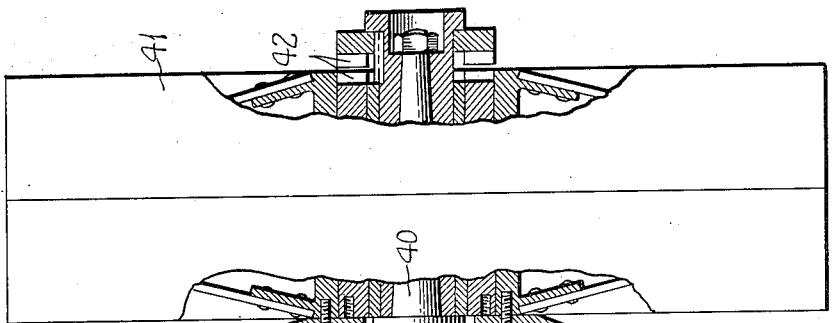
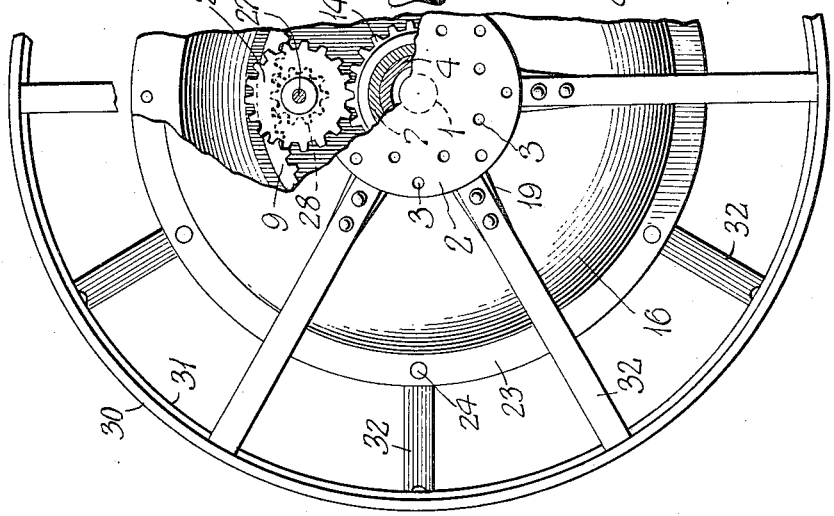
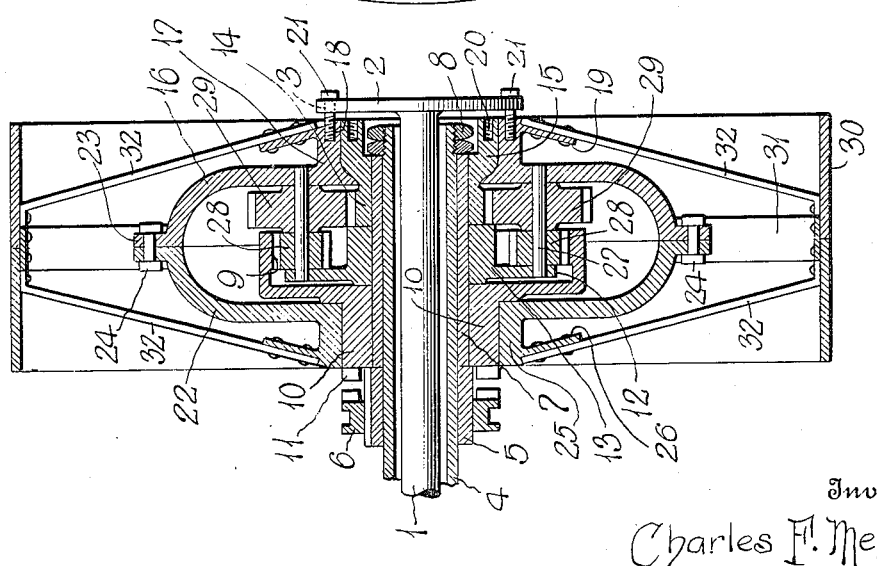
Witnesses
Karl H. Butler
Chas. W. Stauffiger
Inventor
Charles F. Megow,
By
Cashnel & Cashnel
Attorneys

UNITED STATES PATENT OFFICE.

CHARLES F. MEGOW, OF DETROIT, MICHIGAN.

TWO-SPEED WHEEL.

1,169,852. Specification of Letters Patent. Patented Feb. 1, 1916.

Application filed August 30, 1915. Serial No. 47,966.

*To all whom it may concern:*

Be it known that I, CHARLES F. MEGOW, a citizen of the United States of America, residing at Detroit, in the county of Wayne and State of Michigan, have invented certain new and useful Improvements in Two-Speed Wheels, of which the following is a specification, reference being had therein to the accompanying drawings.

This invention relates to a two-speed wheel for vehicles, and more particularly which has been especially designed for motor driven tractors, motor trucks, and automobiles, whereby a variable speed may be obtained by certain adjustment in connection with the wheel.

The primary object of my invention is to provide a vehicle wheel with a planetary gear closed by the hub of the wheel and made practically dirt and dust proof, whereby the wheel can be advantageously used in connection with a farm tractor. It is through the medium of the planetary gearing and certain adjustments that a tractor equipped with wheels in accordance with this invention has two speeds, a high speed suitable for moving the tractor on a road and a low speed for field purposes.

Another object of my invention is to provide a two speed wheel to which power may be transmitted to the drive gear of the wheel, either through a semi-floating or full floating drive axle, or by chain or gear on the rear axle, thus making the two-speed wheel applicable to types of axles now in use.

Another object of my invention is to provide a two-speed vehicle wheel wherein the parts are constructed with a view of reducing the cost of manufacture and at the same time retaining the features by which, durability, simplicity and ease of assembling are secured, and with such ends in view, my invention resides in the novel construction to be hereinafter described and then claimed.

Reference will now be had to the drawings, wherein—

Figure 1 is a vertical sectional view of the two-speed wheel, Fig. 2 is a side elevation of the same, and Fig. 3 is a front elevation of a wheel, partly broken away and partly in section, showing a modification of my invention.

In the drawings, 1 denotes a portion of an axle of the full floating type and the outer end of this portion of the axle has a drive plate or head 2 provided with bolt openings 3.

4 denotes an axle casing and fixed thereon is a bearing 5 for a reciprocable clutch member 6 which may be shifted longitudinally of the bearing 5 by any suitable mechanism.

7 denotes a rotatable bushing on the axle casing 4 abutting the bearing 5 and retained upon said axle casing by nuts 8 screwed upon the outer end of said casing.

9 denotes an internal gear having a hub 10 loose upon the inner end of the bushing 7, said hub terminating in a clutch member 11 adapted to be engaged by the members 6 whereby the internal gear 9 can be non-rotatably held relative to the bearing 5 and the axle 4.

12 denotes a carrier plate having a hub 13 loose on the bushing 7 within the internal gear 9, and abutting the hub 13 is a drive gear 14 having a cupped hub 15 providing clearance for the nut 8 and affording a bearing for the outer section 16 of a sectional hub. The outer hub section 16 has a hub portion 17 loose on the hub portion 15 of the drive gear, and the hub portion 17 has threaded sockets 18 and peripheral lugs 19. The hub portion 15 of the drive gear also has threaded sockets 20, corresponding in number to the threaded sockets 18 of the hub portion 17 of the outer hub section 16.

21 denotes a set of interchangeable bolts adapted to be placed in the openings 3 of the axle drive plate or head 2 to engage either in the threaded sockets 18 of the hub 17 or the threaded sockets 20 of the hub 15. When in the former, the sectional hub is connected to the ends of the axle 1 for rotative continuity therewith, and when in the latter, the drive gear 14 is fixed relative to the axle.

22 denotes an inner hub section coöperating with the outer hub section 16 in providing a hollow hub, and these hub sections have peripheral flanges 23 suitably connected together, as at 24. The inner hub section 22 has a hub portion 25 loose upon the hub portion 10 of the internal gear 9 and the hub portion 25 has peripheral lugs 26 staggered relative to the peripheral lugs 19 of the outer hub section 16.

27 denotes longitudinal pins connecting the carrier plates 12 and the outer hub section 16, said pins providing bearings for pinions 28 and 29, the former meshing with the internal gearing 9 and the latter with the drive gear 14. Instead of a set of pinions on each pin, a compound pinion may be used and it is also possible to use a plurality of sets of pinions instead of two diametrically opposed sets, as shown.

30 denotes a sectional rim having the sections thereof connected by an annular plate 31 and this rim is connected to the lugs 19 and 26 of the sectional hub by a plurality of radially disposed spokes 32.

With the clutch member 6 disengaged and the axle drive plate or head 2 connected to the sectional hub, the wheel structure is in condition for high speed, that is, to revolve in rotative continuity with the axle 1. With the clutch member 6 engaging the clutch member 11 and the drive plate or head 2 of the axle 1 connected to the drive gear 14, the internal gear 9 is held stationary and the sectional hub is driven at a reduced speed relative to the axle 1 through the medium of the differential pinions and the drive gear 14.

As I mentioned at the outset that the wheel could be driven by a gear or sprocket chain, so, I have illustrated such construction in Fig. 3, wherein a stationary axle 40 has a revoluble wheel 41 with clutch members 42 at the outer side of the wheel for low speed. A combined internal-external gear and sprocket wheel 43 is at the inner side of the wheel and can be driven from a suitable source of power. This form is practically a reversal of the parts shown in Figs. 1 and 2, with the drive plate 2 in the form of a gear and sprocket wheel.

It is to be noted that the construction of the two speed wheel affords compactness, rigidity, and strength, and that the sectional hub provides an annular compartment for a lubricant. For tractor purposes where strong metallic wheels are desired, the construction is ideal and the two speeds are sufficient for farming purposes.

It is thought that the operation and utility of the wheel will be apparent without further description, and while in the drawing there is illustrated a preferred embodiment of my invention, it is to be understood that the structural elements are susceptible to such changes in size, shape, and manner of assemblage as fall within the scope of the appended claims.

What I claim is:—

1. The combination of a driven axle having a drive plate at an end thereof, a wheel on said axle adapted to be connected to the drive plate thereof to rotate with said axle, and means in said wheel adapted to be connected to the drive plate of said axle to cause said wheel to rotate at a reduced speed relative to said axle.

2. In a two-speed wheel, a driven axle, a wheel hub, a planetary gear in said hub including an internal gear and a drive gear, means adapted to fix said hub for rotative continuity with said axle, and means adapted to fix said planetary gear whereby said hub is revolved by said axle at a reduced speed relative thereto.

3. In a two-speed wheel, a driven axle, a wheel hub, a planetary gear in said hub including an internal gear and a drive gear, means adapted to fix said hub for rotative continuity with said axle, means adapted to fix said axle relative to the drive gear of said planetary gear, and means adapted to hold the internal gear of said planetary gear when said axle is fixed relative to said drive gear whereby said hub can be rotated by and at a reduced speed to said axle.

4. In a two-speed wheel, a driven axle, a hollow hub, means in said hub including an internal gear and a drive gear whereby said hub can be rotated by and at a reduced speed to said axle, and means independent of the first mentioned means for fixing said hub relative to said axle for rotative continuity therewith.

5. In a wheel, a driven axle, a planetary gear, a clutch member adapted to engage a portion of said gear to cause said wheel to rotate at a reduced speed relative to said axle, and means independent of said gear and clutch member adapted to fix said wheel for rotative continuity with said axle.

6. In a wheel, a driven axle, a planetary gear, a clutch member adapted to engage a portion of said gear to cause said wheel to rotate at a reduced speed relative to said axle, and interchangeable means in one position adapted to coöperate with said clutch member and in another position cause rotative continuity of said driven axle and said wheel.

7. In a wheel, a driven axle, a planetary gear, a clutch member at the inner side of said wheel adapted to engage a portion of said gear to cause said wheel to rotate at a reduced speed relative to said axle, and interchangeable means at the outer side of said wheel in one position adapted to coöperate with said clutch member and in another position cause rotative continuity of said driven axle and said wheel.

8. The combination with a driven axle, of a hub thereon, a planetary gear in said hub having an internal gear exposed at the inner end of said hub and a drive gear exposed at the outer end of said hub, means adapted to hold said internal gear stationary, and means engageable with said drive gear to cause said hub to revolve at a different speed than that of said axle, said means being also engageable with said hub to cause said hub and said axle to rotate in synchronism.

9. In a wheel, a driven axle, a hollow hub, an internal gear in said hub, means adapted to hold said internal gear stationary, a drive gear in said hub, a carrier plate in said hub and movable therewith, pinions supported between said carrier plate and said hub meshing with said internal gear and with said drive gear, and means adapted to connect said axle to said hub for high speed when said internal gear is free to revolve, and to said drive gear for low speed when said internal gear is stationary.

In testimony whereof I affix my signature in presence of two witnesses.

CHARLES F. MEGOW.

Witnesses:
KARL H. BUTLER,
ANNA M. DORR.